United States Patent Office 2,785,078
Patented Mar. 12, 1957

2,785,078

COMPOSITION FOR PREVENTING CORROSION OF METAL

Patrick J. Keating, Jr., Scarsdale, and Theodore C. Heisig, White Plains, N. Y., assignors to The Texas Company, New York, N. Y., a corporation of Delaware No Drawing. Application June 30, 1954,
Serial No. 440,526

8 Claims. (Cl. 106—14)

The present invention relates to protecting metal bodies against corrosion, especially the inner surfaces of tanks and vessels. More particularly, it is concerned with applying and maintaining an adherent protective coating to the interior surfaces of ballast tanks and the like formed of ferrous materials and subjected to the corrosive effect of air and water, particularly salt water. Other tanks which may be protected by the invention are coffer dams, bilges, voids, rudders, dry docks, and fire tower water tanks.

In accordance with the present invention, an effective rust preventive coating is applied to the interior walls of the vessel, tank or container as a fluent composition comprising a relatively viscous petroleum residuum from a naphthene base crude oil, a relatively fluid light petroleum oil, and a small quantity of surface active agents effective to increase the penetration and adhesivity of the composition to solid surfaces and reduce corrosion.

Although the composition can be applied in any desired way, as by brushing or spraying, it is preferred to apply it by flotation to the interior walls of tanks. The composition advantageously is floated upon the surface of a body of water as a uniform layer of substantial thickness and the water level is thereafter progressively altered, leaving a uniform protective coating strongly adhering to the walls of the vessel. For example, the composition is placed in the bottom of a tank and water is then introduced below the composition to form a floating surface layer. The water level is continually raised by pumping additional water into the lower part of the tank. As the water rises upwardly, the composition continues to float on the upper surface as a uniform unbroken layer which, at its margins, makes uniform contact with the interior surfaces of the vessel, merging therewith and leaving a continuous uniform and highly adherent film. Alternatively, the tank may be filled with water, the surface layer of composition introduced, and the water thereafter drained to effect surface coating. Sometimes several passes of the coating material up and down may be required for the initial coating.

Surprisingly, our novel fluent coating material repels the surface moisture and bonds with the interior surfaces of the vessel to form a highly adhesive film which remains continuously in place in spite of repeated draining and refilling of the tank and violent agitation of its contents. Since contact of water or atmosphere with the ferrous surfaces is effectively prevented by the resultant coating, the objectionable rusting or corrosion which otherwise takes place in vessels of this character is effectively overcome.

The floating procedure of the present invention is of particular advantage from the standpoint of obviating the high cost and difficulty of applying a rust-preventive coating to the interior of a tank. The complex interior structure of ship ballast tanks, for example, made former manual procedures economically undesirable because staging had to be built for men to work on. Moreover, because of obstructions such as ladders, gussets, frames, and baffles which hinder the workers, it has been difficult by such manual means to obtain a uniform coating over the entire interior surface, even where these surfaces are first prepared by chipping or sand blasting. Accordingly, exposed spots, cracks or thin areas tend to initiate points of rapid corrosion.

In ship ballast tanks or the like a small residual quantity of coating material may be permitted to remain on the surface of the ballast water within the tank, and relatively small amounts may be added periodically prior to discharging or taking on ballast, to render the protection a permanent one.

The novel fluent coating material in accordance with the present invention comprises a base composition composed of a straight run residuum from a naphthene base type of crude oil, a light lubricating distillate, and a surface active agent in the form of tall oil. To this base composition is added a small quantity of another surface active agent in the form of fatty or aliphatic diamine having the general formula:

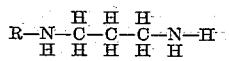

wherein R represents an alkyl group derived from a fatty acid having from 8 to 18 carbon atoms.

The straight run residuum can be a high viscosity residual oil having a Saybolt-Furol viscosity of 40–55 seconds at 210° F. Desirably this residuum constitutes 25–40% of the base composition by volume.

The residuum, per se, is ordinarily too viscous to flow readily over the surface of a body of water and is therefore thinned to the desired fluency with a suitable light petroleum stock which is miscible with the residuum to form a homogeneous solution. For the present purposes, a final composition is preferred having a Saybolt-Furol viscosity in the range of about 25–50 seconds at 122° F. In this range of fluency the liquid will spread uniformly across the surface of the water, making good contact with confining surfaces at its margins. A narrower preferred range of viscosity for the final composition is about 30–40 seconds.

A suitable light petroleum stock for thinning the residuum to the desired viscosity is a light lubricating distillate having a Saybolt-Universal viscosity of 100–175 seconds at 100° F., for example 100 seconds. Advantageously, middle distillates are selected having a flash point above about 350° F. to avoid fire hazard. The light petroleum oil desirably constitutes 55–70% of the base composition by volume.

The adhesivity increasing and corrosion preventing surface active agents preferred in accordance with the present invention are tall oil such as crude tall oil obtainable under the trade name Liqro, and a fatty diamine wherein the alkyl groups are derived from tallow fatty acids. Such a fatty diamine contains various alkyl groups having from 14 to 18 carbon atoms derived from the myristic, palmitic, stearic, oleic, and linoleic acids of tallow, and has a theoretical molecular weight of 329. In its commercially available form the fatty diamine is a light red soft paste having a melting range of 44–48° C., a specific gravity of 0.832, and normally contains about 80% of amine, calculated as diamine. Diamine contents mentioned hereinafter are the actual amine contents calculated as diamine.

First, the tall oil is dissolved in the mixture of residuum and light distillate in an amount sufficient to form a base compound or mixture containing up to 5% of tall oil by volume. Then the base compound is heated to 130–150° F., the fatty diamine paste is heated to the same temperature, and the latter is then added with stirring to the base compound in quantity sufficient to provide an effective corrosion inhibiting amount up to 4% by weight of the final coating material as diamine.

Obviously, the ingredients can be combined in other ways within the scope of the invention, the particular order not being essential to the invention.

In general, the tall oil is effective in proportions of from about 1–5% by volume of the base compound, and preferably about 2–4%. An amount between 0.4% and 2% of fatty diamine advantageously is used. Higher percentages than 5% of tall oil and 4% of diamine are not disadvantageous, but are unnecessary to confer adequate penetration, adhesivity, and corrosion resistance and therefore are not economical.

Various corrosion prevention tests performed on fluent coating materials compounded in accordance with the invention clearly demonstrated its superiority over the best compound previously known to us (compound A below). The following coating materials were compounded and tested:

A. 33.3 volumes of a 42–45 second Saybolt-Furol viscosity at 210° F. straight run residuum from distilling a naphthene base crude oil.
   63.8 volumes of a non-refined distillate having a Saybolt-Universal viscosity of 125–145 seconds at 100° F.
   2.9 volumes of crude tall oil.
   The resulting mixture had a Saybolt-Furol viscosity of 30–40 seconds at 122° F., and a specific gravity of 0.9421 at 60° F. compared with water at the same temperature.
   This composition A is one which has had wide commercial acceptance as an exceptionally good corrosion preventer for ballast tanks.

B. 99.5 parts by weight of A.
   0.4 part by weight of fatty diamine as described above (0.5 part crude diamine), wherein the alkyl groups are derived from tallow fatty acids.

C. 99 parts by weight of A.
   0.8 part by weight of fatty diamine (1.0 part crude diamine) as in B.

D. 98 parts by weight of A.
   1.6 parts by weight of fatty diamine (2.0 parts crude diamine) as in B.

HUMIDITY CABINET TESTS

Bright steel test panels 2 x 4 x 1/16 inches were dipped in the materials under test at room temperature, allowed to drain for 2 hours, and suspended in a humidity cabinet operating at 120° F. with a relative humidity of 100%. Parallel tests were conducted on panels that were dry and wet with water before dipping. The panels were periodically examined for corrosion and the amount of rust noted.

*Table I*

| Hours | Composition | | | | | | | |
|---|---|---|---|---|---|---|---|---|
| | A | | B | | C | | D | |
| | Dry | Wet | Dry | Wet | Dry | Wet | Dry | Wet |
| 24 | 1 speck | 1 speck | Clean | Clean | Clean | Clean | Clean | Clean. |
| 72 | 2 specks | several specks | do | do | do | do | do | Do. |
| 144 | num. specks | num. specks | do | do | do | do | do | Do. |
| 192 | do | do | 1 speck | do | do | do | do | Do. |
| 240 | do | do | several specks | several specks | do | do | do | Do. |
| 312 | 1 large spot and num. specks | do | do | several spots | do | do | do | Do. |
| 360 | do | do | do | num. spots and specks | several specks | do | do | Do. |
| 480 | several large spots and 20% light rust | do | num. specks | many spots and specks | do | several specks | do | Do. |
| 528 | | | do | do | num. specks | do | do | Do. |
| 648 | | | many specks | do | many specks | num. specks | several specks | num. specks |

As a result of using the tall oil and fatty diamine the novel final composition has a wetting power higher than that of water. The highly adhesive coating material actually displaces surface moisture and substitutes therefor on the tank surfaces, forming a preferential and essentially permanent bond. Moreover, the described coatings actually penetrate through rust, slime, or similar surface accumulations even in the presence of moisture. This action is important from the standpoint of obviating the costly surface preparation usually required.

The above Table I shows that the composition A (without diamine) started to rust after only 24 hours under test, whereas as little as 0.4% diamine in B was still providing good protection after 144 hours—a 6-fold improvement. The 1.6% diamine in D provided a 22-fold improvement, protecting 528 hours without rusting.

RESISTANCE TO WATER WASHING TEST

Bright steel panels 2 x 3 x 1/16 inches were dipped in the materials under test and allowed to drain for 4 hours at room temperature. The panels were then immersed in synthetic sea water for one day followed by hanging in air for one day, and this cycle was repeated for 25 days. Some panels were wet with water, and others dry when dipped.

Table II

| Days in Water | Total Days Exposed to Air and Water | Composition | | | | | | | |
|---|---|---|---|---|---|---|---|---|---|
| | | A | | B | | C | | D | |
| | | Dry | Wet | Dry | Wet | Dry | Wet | Dry | Wet |
| 1 | 1 | 5% lt. rust | many spots and specks. | 2 specks | Clean | Clean | Clean | several spots | Clean. |
| 2 | 4 | 30% light rust | 40% light rust | do | do | do | do | several large spots. | Do. |
| 3 | 6 | 40% light rust | do | 2 patches, num. spots. | 1 patch, several spots. | num. large spots. | do | do | 1 speck. |
| 4 | 8 | 50% light rust | 50% light rust | do | do | several large patches, num. spots. | do | 1 patch, several large spots. | Do. |
| 5 | 11 | 70% light rust | 60% light rust | 5% light rust | 3% light rust | 5% lt. rust | several spots | 10% lt. rust | 2 patches. |
| 6 | 13 | 75% light rust | 70% light rust | 10% light rust | 10% light rust | 10% lt. rust | num. spots, specks. | 15% light rust | 5% light rust. |
| 8 | 18 | 85% lt.-mod. rust. | 80% lt.-mod. rust. | 70% light rust | 50% light rust | 40% light rust | 10% light rust | 20% light rust | 20% light rust. |
| 10 | 21 | 85% mod. rust. | 80% mod. rust. | 75% lt.-mod. rust. | 60% lt.-mod. rust. | 50% lt.-mod. rust. | 40% lt.-mod. rust. | 25% lt.-mod. rust. | 30% lt.-mod. rust. |
| 12 | 25 | 85% mod. rust. | do | 80% mod. rust. | 70% mod. rust. | 55% mod. rust. | 50% mod. rust. | 25% mod. rust. | 45% mod. rust. |

Again the remarkable superiority of compositions B, C, and D (0.4–1.6% diamine) is demonstrated over composition A containing no diamine.

4% SALT SPRAY TEST

Bright steel test panels 2 x 3 x 1/16 inches were dipped in the materials under test and allowed to drain for 2 hours. They were then placed at a 45° angle in a salt spray cabinet and subjected to sprays of 4% salt water at a temperature of 95–110° F. while maintaining 12 pounds per square inch air pressure in the cabinet. Some panels were wet with water and others dry when dipped.

WATER DISPLACEMENT AND WATER STABILITY TEST

Test panels 2 x 3 x 1/16 inch were formed of carbon steel, sandblasted, and cleaned thoroughly. Fifty cc. of the material under test were placed in a 125 cc. flask, 5 cc. of distilled water added, and the mixture thoroughly shaken. The stoppered flask was stored overnight at 130° F. and then cooled to 77° F. for testing.

Each test panel was dipped in distilled water momentarily and drained in a vertical position for not more than 5 seconds with the lower edge on blotting paper.

Table III

| Hours | Composition | | | | | | | |
|---|---|---|---|---|---|---|---|---|
| | A | | B | | C | | D | |
| | Dry | Wet | Dry | Wet | Dry | Wet | Dry | Wet |
| 20 | 100% heavy rust | 100% heavy rust | 85% mod. rust | 10% mod. rust | 70% mod. rust | 20% mod. rust | 25% mod. rust | 40% mod. rust. |
| 48 | | | 95% heavy rust | 70% heavy rust | 95% heavy rust | 85% heavy rust | 85% heavy rust | 85% heavy rust. |
| 0 | | | 99% heavy rust | 95% heavy rust | 99% heavy rust | 95% heavy rust | 95% heavy rust | 95% heavy rust. |

This severe salt spray test again demonstrates the surprising and unpredictable superiority of the compositions containing diamine in contrast to composition A without diamine.

STATIC WATER DROP TEST

Test specimens were formed as equilateral triangles from 1/32 inch thick carbon steel. Each specimen had an altitude of 1.625 inch and was provided with a central dimple having a spherical radius of .75 inch. In performing the test a specimen was first polished and cleaned, and the corners were bent to form legs. It was then immersed in the material under test with the concave side of the dimple up, and the test beaker was placed for 1 hour in an oven at 140° F. Then the beaker was removed from the oven, a drop of water was placed in the dimple below the oil's surface, and the beaker was restored to the oven at 140° F. After 5 days the beaker was again removed from the oven and the extent of corrosion in the dimple observed.

Table IV

| Composition | Appearance after 5 Days |
|---|---|
| A | Black stain, severe etching. |
| B | Gray stain, slight etching. |
| C | Do. |
| D | Do. |

The panel was then immersed horizontally for 15 seconds in a shallow dish containing the above mixture. After draining momentarily the test panel was placed in a humidity cabinet for one hour at 77° F. Thereafter the amount of corrosion was observed visually.

Table V

| Composition | Appearance After 1 Hour Exposure |
|---|---|
| A | Numerous specks of rust. |
| B | Do. |
| C | Clean. |
| D | Do. |

As shown in the several tests described above, amounts of diamine as low as 0.4% by weight provide a surprising improvement in the corrosion resistance of metals treated with the coating material of the invention. The only one of the five tests in which 0.4% diamine (B) showed little improvement over composition A was the water displacement and water stability test, wherein results equivalent to the base composition A were obtained. In all five tests 0.8% and 1.6% diamine compositions were far superior to the base composition A.

It will be apparent to those skilled in the art that the compositions described in detail herein may be modified to some extent by the addition of other materials which do not materially affect their basic and novel characteristics. For example, successful results have been obtained using compositions as described above which have also included small quantities, say 1% by weight, of either an isobutylene polymer or an oxidized wax fraction.

Obviously, many modifications and variations of the invention, as hereinbefore set forth, may be made without departing from the spirit and scope thereof, and therefore only such limitations should be imposed as are indicated in the appended claims.

We claim:

1. A fluent coating material having the property of floating on water and suitable for application by water flotation to the inner walls of a metal tank to protect said tank from corrosion, said material being the product of mixing together (a) a mixture consisting essentially of 1 to 5% of tall oil by volume, residual oil from straight run distilling a naphthene base crude oil, said residual oil having a Saybolt-Furol viscosity of 40–55 seconds at 210° F., and sufficient petroleum oil of lower viscosity than said residual oil to thin said residual oil and form a coating material having a Saybolt-Furol viscosity in the range of about 25–50 seconds at 122° F.; and (b) a corrosion inhibiting amount of aliphatic diamine.

2. A fluent coating material in accordance with claim 1 wherein said residual oil constitutes 25–40%, said petroleum oil constitutes 55–70%, and said tall oil constitutes 2–4% of said mixture by volume; and wherein said diamine constitutes 0.4–2% of said fluent coating material by weight.

3. A fluent coating material in accordance with claim 2 wherein said residual oil constitutes about 33.3%, said petroleum oil constitutes about 63.8%, and said tall oil constitutes about 2.9% of said mixture by volume; and wherein said diamine constitutes about 1.6% of said fluent coating material by weight.

4. A fluent coating material in accordance with claim 1 wherein said petroleum oil has a viscosity of about 100–175 seconds Saybolt-Universal at 100° F.

5. A fluent coating material in accordance with claim 1 wherein said diamine has the general formula:

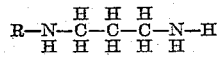

wherein R represents an alkyl group having from 8 to 18 carbon atoms.

6. A fluent coating material in accordance with claim 5 wherein said alkyl group is derived from tallow fatty acids.

7. A fluent coating material having the property of floating on water and suitable for application by water flotation to the inner walls of a metal tank to protect said tank from corrosion, said material being the product of mixing together tall oil; a corrosion inhibiting amount of an aliphatic diamine; residual oil from straight-run distilling a naphthene base crude oil, said residual oil having a Saybolt-Furol viscosity of 40–55 seconds at 210° F.; and sufficient petroleum oil of lower viscosity than said residual oil to thin said residual oil and form a coating material having a Saybolt-Furol viscosity in the range of about 25–50 seconds at 122° F., said tall oil being present in an amount between 1 and 5% by volume of the sum of the volumes of said tall oil, said residual oil, and said petroleum oil.

8. A fluent coating material in accordance with claim 7 wherein said residual oil constitutes 25–40% by volume, said petroleum oil has a Saybolt-Universal viscosity of 100–175 seconds at 100° F. and constitutes 55–70% by volume, said tall oil constitutes 2–4% by volume of said sum, and wherein said aliphatic diamine has the general formula:

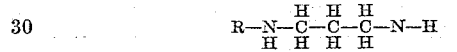

wherein R represents an alkyl group having from 8 to 18 carbon atoms, said aliphatic diamine constituting 0.4–2% by weight of said fluent coating material.

References Cited in the file of this patent

UNITED STATES PATENTS

| | | |
|---|---|---|
| 1,850,700 | Taylor | Mar. 22, 1932 |
| 2,286,244 | Whitacre | June 16, 1942 |
| 2,436,599 | Read et al. | Feb. 24, 1948 |
| 2,461,971 | Fischer | Feb. 15, 1949 |